United States Patent
Meng et al.

(10) Patent No.: US 9,652,492 B2
(45) Date of Patent: *May 16, 2017

(54) OUT-OF-ORDER EXECUTION OF STRICTLY-ORDERED TRANSACTIONAL WORKLOADS

(71) Applicant: International Business Machines Corporation, Armonk, NY (US)

(72) Inventors: Shicong Meng, Elmsford, NY (US); Li Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/023,867

(22) Filed: Sep. 11, 2013

(65) Prior Publication Data
US 2014/0310253 A1 Oct. 16, 2014

Related U.S. Application Data

(63) Continuation of application No. 13/863,022, filed on Apr. 15, 2013.

(51) Int. Cl.
*G06F 17/30* (2006.01)
*G06F 9/46* (2006.01)

(52) U.S. Cl.
CPC ........ *G06F 17/30377* (2013.01); *G06F 9/466* (2013.01); *G06F 17/30371* (2013.01)

(58) Field of Classification Search
CPC .............................. G06F 9/466; G06Q 10/10
USPC ....................................................... 707/607
See application file for complete search history.

(56) References Cited

U.S. PATENT DOCUMENTS

| | | | | |
|---|---|---|---|---|
| 5,269,020 A | * | 12/1993 | Kakimoto | ......... G06F 17/30362 |
| 6,009,265 A | | 12/1999 | Huang et al. | |
| 6,182,186 B1 | * | 1/2001 | Daynes | ..................... G06F 9/52 |
| | | | | 710/200 |

(Continued)

OTHER PUBLICATIONS

Itziar Arrieta-Salinas, et al., "Classic Replication Techniques on the Cloud", 2012 Seventh International Conference on Availability, Reliabiilty and Security, 2012 IEEE, pp. 268-273.

(Continued)

*Primary Examiner* — Scott A Waldron
*Assistant Examiner* — Dongming Wang
(74) *Attorney, Agent, or Firm* — F. Chau & Associates, LLC

(57) ABSTRACT

A method of transaction processing includes receiving a plurality of transactions from an execution queue, acquiring a plurality of locks corresponding to data items needed for execution of the plurality of transactions, executing each transaction of the plurality of transactions upon acquiring all locks needed for execution of each transaction, and releasing the locks needed for execution of each transaction of the plurality of transactions upon committing each transaction. The plurality of transactions have a specified order within the execution queue, the plurality of locks are sequentially acquired based on the specified order of the plurality of transactions within the execution queue, and an order of execution of the plurality of transactions is different from the specified order of the plurality of transactions within the execution queue.

20 Claims, 6 Drawing Sheets

(56) References Cited

U.S. PATENT DOCUMENTS

| | | | | |
|---|---|---|---|---|
| 6,397,352 | B1* | 5/2002 | Chandrasekaran et al. | 714/16 |
| 6,412,034 | B1* | 6/2002 | Chan | 710/200 |
| 6,823,356 | B1 | 11/2004 | Novaes et al. | |
| 6,848,109 | B1 | 1/2005 | Kuhn | |
| 7,124,415 | B1 | 10/2006 | Luft | |
| 7,210,019 | B2* | 4/2007 | Corrado | 711/208 |
| 7,363,453 | B1* | 4/2008 | Arnan et al. | 711/170 |
| 7,418,706 | B1* | 8/2008 | Luo et al. | 718/103 |
| 7,653,668 | B1 | 1/2010 | Shelat et al. | |
| 8,086,566 | B2 | 12/2011 | Edlund et al. | |
| 8,095,741 | B2 | 1/2012 | Heller, Jr. et al. | |
| 8,140,522 | B2 | 3/2012 | Min et al. | |
| 8,201,171 | B2 | 6/2012 | Duffy et al. | |
| 8,214,612 | B1 | 7/2012 | Natanzon | |
| 8,281,185 | B2* | 10/2012 | Nussbaum et al. | 714/15 |
| 8,301,593 | B2 | 10/2012 | Hoffmann et al. | |
| 8,977,591 | B1 | 3/2015 | Syed et al. | |
| 2002/0194015 | A1 | 12/2002 | Gordon et al. | |
| 2005/0203962 | A1 | 9/2005 | Zhou et al. | |
| 2007/0011417 | A1 | 1/2007 | Sicola | |
| 2009/0049054 | A1 | 2/2009 | Wong et al. | |
| 2010/0145911 | A1 | 6/2010 | Germer et al. | |
| 2012/0150802 | A1 | 6/2012 | Popov et al. | |
| 2012/0254887 | A1 | 10/2012 | Rodriquez | |
| 2012/0278288 | A1 | 11/2012 | Deshmukh et al. | |
| 2012/0324472 | A1 | 12/2012 | Rossbach et al. | |

OTHER PUBLICATIONS

Nalini Belaramani, et al., "PRACTI Replication, USENIX Association, NSDI '06: 3rd Symposium on Networked Systems Design & Implementation", pp. 59-72.

Peter Bodik, et al., "Surviving Failures in Bandwidth-Constrained Datacenters", SIGCOMM '12, Aug. 13-17, 2012, Helsinki, Finland.

William J. Bolosky, et al., "Paxos Replicated State Machines as the Basis of a High-Performance Data Store", nsdi '11, 8th USENIX Symposium on Networked Systems Design and Implementation, Mar. 30-Apr. 1, 2011, Boston, MA.

Alexander Thomson, et al., "Calvin: Fast Distributed Transactions for Partitioned Database Systems", SIGMOD '12, May 20-24, 2013, Scottsdale, Arizona.

Tuan Cao, et al., "Fast Checkpoint Recovery Algorithms for Frequently Consistent Applications", SIGMOD '11, Jun. 12-16, 2011, Athens, Greece.

Tushar Chandra, et al., "Paxos Made Live—An Engineering Perspective", ACM PODC 2007, pp. 1-16.

Wyatt Lloyd, et al., "Don't Settle for Eventual: Scalable Casual Consistency for Wide-Area Storage With COPS", SOSP '11, Oct. 23-26, 2011, Cascais, Poland, pp. 1-16.

David Lomet, et al., "Unbundling Transaction Services in the Cloud", CIDR Perspectives 2009.

Tin Tin Nyo, "Maximizing the Degree of Concurrency and Consistency in Distributed Parallel Processing Environment", 2009 IEEE, pp. 258-262.

C. Mohan, et al., "Transaction Management in the R* Distributed Database Management System", ACM Transactions on Database Systems, vol. 11, No. 4, Dec. 1986, pp. 378-396.

Edward K. Lee and Chandramohan A. Thekkath, "Petal: Distributed Virtual Disks", Published in the Proceedings of the 7th International Conference on Architectural Support for Programming Languages and Operating Systems—1996; pp. 1-9.

Jun Rao, et al., Using Paxos to Build a Scalable, Consistent, and Highly Available Datastore, Proceedings of the VLDB Endowment, vol. 4, No. 4, pp. 243-254.

Sudipto Das, et al., "G-Store: A Scalable Data Store for Transactional Multi key Access in the Cloud", SoCC'10, Jun. 10-11, 2010, Indianapolis, Indiana.

James C. Corbett, et al., "Spanner: Google's Globally-Distributed Database", Published in the Proceedings of OSDI 2012. pp. 1-14.

Haifeng Yu, et al., "Design and Evaluation of a Continuous Consistency Model for Replicated Services", http://www.cs.duke.edu/ari/issag/TACT/.

US OA dated Mar. 13, 2015 for U.S. Appl. No. 13/863,065.
US OA dated Mar. 18, 2015 for U.S. Appl. No. 14/023,921.
US OA dated Mar. 26, 2015 for U.S. Appl. No. 13/863,022.
US OA dated Sep. 3, 2015 for U.S. Appl. No. 13/863,065.
US OA dated Sep. 3, 2015 for U.S. Appl. No. 14/023,921.

* cited by examiner

OUT-OF-ORDER EXECUTION OF STRICTLY-ORDERED TRANSACTIONAL WORKLOADS

CROSS-REFERENCE TO RELATED APPLICATIONS

This application is a Continuation Application of U.S. application Ser. No. 13/863,022, filed on Apr. 15, 2013, the disclosure of which is incorporated by reference herein in its entirety.

BACKGROUND

1. Technical Field

The present disclosure relates to transaction processing, and more particularly, to a system and method for out-of-order execution of strictly-ordered transactional workloads.

2. Discussion of Related Art

In a transaction processing system, sequential execution of workloads is often required to ensure the consistency of real world events and the correctness of processes. For example, two events with causal relationships (e.g., a deposit of $100 and a withdrawal of $100) should be processed by an event processing system with the correct causal order. As another example, in a system that uses replicated state machines, all state machines should sequentially execute the same series of workloads to ensure that their states are always consistent relative to each other.

Sequential execution of workloads, however, may result in decreased performance. For example, using a single process/thread to process a large amount of workloads can result in prohibitively long execution latency and limited throughput. While parallel execution may be used instead of sequential execution to improve latency and throughput when executing workloads that are entirely independent from each other, utilization of traditional parallel processing techniques may not be successfully used for dependent workloads for which the results of execution depend on the order of execution of the workloads.

BRIEF SUMMARY

According to an exemplary embodiment of the present invention, a method of transaction processing includes receiving a plurality of transactions from an execution queue, acquiring a plurality of locks corresponding to data items needed for execution of the plurality of transactions, executing each transaction of the plurality of transactions upon acquiring all locks needed for execution of each transaction, and releasing the locks needed for execution of each transaction of the plurality of transactions upon committing each transaction. The plurality of transactions have a specified order within the execution queue, the plurality of locks are sequentially acquired based on the specified order of the plurality of transactions within the execution queue, and an order of execution of the plurality of transactions is different from the specified order of the plurality of transactions within the execution queue.

In an exemplary embodiment, at least two transactions of the plurality of transactions are executed at a same time.

In an exemplary embodiment, an order in which the plurality of locks are acquired is different from an order in which the plurality of locks are released.

In an exemplary embodiment, the method further includes maintaining a data lock queue including a plurality of pending data locks, each pending data lock corresponding to one of the data items, wherein the plurality of pending data locks are part of the plurality of locks, maintaining a transaction lock queue including a plurality of pending transaction locks, each pending transaction lock corresponding to one of the plurality of transactions, wherein the plurality of pending transaction locks are part of the plurality of locks, adding a new lock to the data lock queue and the transaction lock queue when the new lock is unable to be acquired for a target data item, and removing the new lock from the data lock queue and the transaction lock queue upon acquiring the new lock.

In an exemplary embodiment, executing each transaction includes an initial execution operation that identifies a read-write set of the transaction and ignores all write operations corresponding to the transaction, and an actual execution operation. The initial execution operation is performed prior to acquiring the plurality of locks and the read-write set is used to acquire the plurality of locks, and the actual execution operation is performed subsequent to acquiring the plurality of locks.

In an exemplary embodiment, the method further includes prefetching read results from a datastore corresponding to each of the plurality of transactions upon receiving each of the plurality of transactions, and storing the prefetched read results in a local memory cache.

According to an exemplary embodiment of the present invention, a transaction processing system includes a transaction manager and an execution engine. The transaction manager is configured to receive a plurality of transactions from an execution queue, and acquire a plurality of locks corresponding to data items needed for execution of the plurality of transactions. The plurality of transactions have a specified order within the execution queue, and the plurality of locks are sequentially acquired based on the specified order of the plurality of transactions within the execution queue. The execution engine is configured to execute each transaction of the plurality of transactions upon acquiring all locks needed for execution of each transaction. An order of execution of the plurality of transactions is different from the specified order of the plurality of transactions within the execution queue. The transaction manager is further configured to release the locks needed for execution of each transaction of the plurality of transactions upon the transaction manager committing each transaction.

In an exemplary embodiment, the data items are located in a datastore, and the transaction manager is decoupled from the datastore.

In an exemplary embodiment, the datastore includes one of a NoSQL database or a relational database.

In an exemplary embodiment, executing each transaction includes reading first data and writing second data. The reading of the first data and the writing of the second data may overlap. For example, one transaction may read a data item d and then update the data item d to a new value.

The execution engine may be configured to read the first data from a local memory cache corresponding to the datastore, and write the second data to the local memory cache.

The execution engine may be configured to attempt to read the first data from a local memory cache corresponding to the datastore prior to reading the first data from the datastore, and only write the second data to the local memory cache.

In an exemplary embodiment, the transaction manager includes a plurality of transaction managers, the execution engine includes a plurality of execution engines, the datastore is divided into a plurality of partitions, and each of the plurality of transaction managers and execution engines corresponds to a different partition.

In an exemplary embodiment, each of the execution engines are configured to transmit local read results based on local data items to remote partitions, execute transactions of the plurality of transactions that perform a local read or write operation, and ignore transactions of the plurality of transactions that perform a remote read or write operation.

In an exemplary embodiment, the transaction processing system further includes a backup and recovery engine configured to generate a snapshot of all data stored on the datastore upon the transaction manager committing each transaction, and load a most recent snapshot upon a failure of the transaction processing system.

BRIEF DESCRIPTION OF THE SEVERAL VIEWS OF THE DRAWINGS

Exemplary embodiments of the present disclosure will be described below in more detail, with reference to the accompanying drawings, in which.

DETAILED DESCRIPTION

Exemplary embodiments of the present invention now will be described more fully hereinafter with reference to the accompanying drawings. This disclosure, may however, be embodied in many different forms and should not be construed as limited to embodiments set forth herein.

Exemplary embodiments of the present invention provide an out-of-order execution framework that can be utilized for parallel execution of transactions. According to exemplary embodiments, a transaction processing system and method implements parallel execution of transactions in a manner that results in obtaining execution results that are the same as execution results performed using sequential execution following a specific order of input workloads. The transaction processing system and method implementing an out-of-order execution framework may provide high execution efficiency as a result of improving latency and throughput.

Exemplary embodiments of the present invention may be implemented with systems including, but not limited to, event processing systems, distributed databases, distributed application servers, distributed storage, distributed publish and subscribe systems, etc. For ease of description, exemplary embodiments may be described herein with reference to distributed databases that are replicated across geographically distributed datacenters and process transaction workloads in the background.

Figure 1:
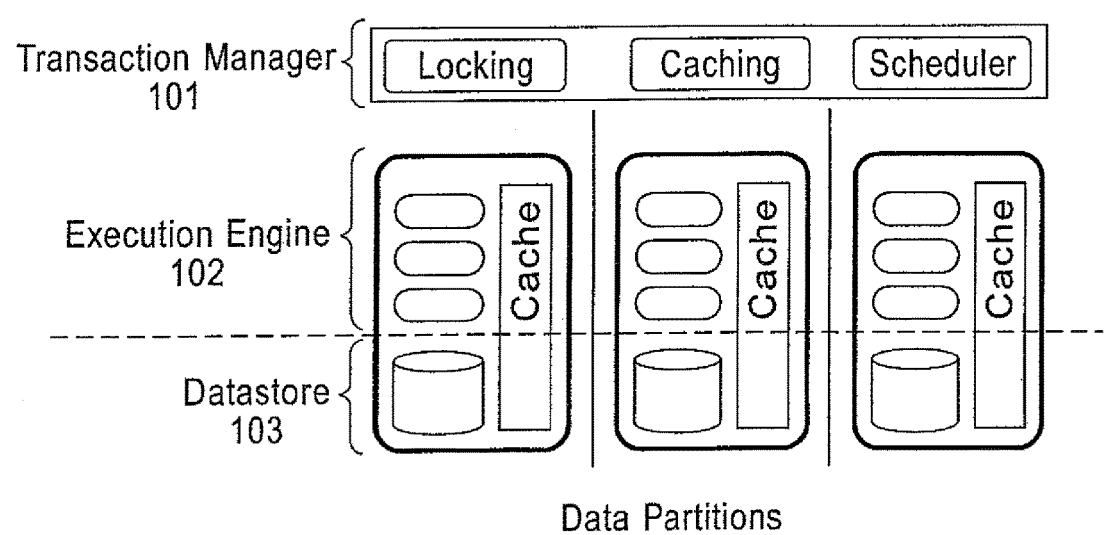
FIG. 1 shows an overview of a transaction processing system, according to an exemplary embodiment of the present invention.

FIG. 1 shows an overview of a transaction processing system, according to exemplary embodiments of the present invention. As shown in FIG. 1, the transaction processing system 100 may include a transaction manager 101, an execution engine 102, and a datastore 103, which are each described in further detail below.

A series of transactions, which have a specified order, may be received by the transaction processing system 100 as input via an execution queue. The transaction manager 101 may schedule the in-order execution of the received transactions in a manner resulting in the execution results being the same as those of strict sequential execution, without actually requiring the strict sequential execution of the transactions. For example, the transaction manager 101 may utilize out-of-order parallel execution with respect to the received transactions in a manner that results in the execution results being the same as those of strict sequential execution, even though the transactions are actually executed in parallel. As a result, transaction execution throughput and latency may be improved, and sequential consistency of data access may be achieved.

The transaction manager 101 may be decoupled from the underlying storage of the system by identifying read-write sets of transactions before the execution of the transactions. As used herein, a read-write set of a transaction refers to a set of data items that are read, updated, created or deleted by a transaction. As a result, a locking service implemented by the transaction manager 101 may be independent from the underlying storage implementation, and may be utilized with various storage implementations. That is, the locking service may be implemented without specific knowledge of the physical layout of data in a datastore 103. For example, the locking service is based on logical keys, and may be utilized with any storage implementation of a datastore 103 in which each data item can be uniquely identified by a data ID. Thus, exemplary embodiments may be utilized with a datastore 103 utilizing an underlying storage implementation including, for example, a regular file system, a key-value store, a NoSQL database such as, for example, MongoDB and HBase, or a full-featured relational database.

Herein, a transaction may described as including three stages: a locking stage, an execution stage, and a commit/abort stage. During the locking stage, locks for all data items accessed by (e.g., needed by) the transaction are acquired. During the execution stage, the transaction is executed (e.g., ran). Executing the transaction may include performing reading, updating, creating, and/or deleting operations in accordance with the transaction. The changes resulting from the execution of a transaction may be kept in a temporary memory region, which is not visible to other transactions. During the final commit/abort stage, if the execution is successful, the transaction manager 101 applies the changes made by the transaction to the datastore 103 (e.g., the transaction is committed). Once the commit has been completed, the changes become visible to all other transactions. If the execution is not successful (e.g., if the transaction attempts to delete a data item that does not exist in the datastore 103), the transaction manager 101 aborts the transaction and discards the changes that have been recorded in the temporary memory region (e.g., the transaction is aborted and is not committed). As a result, such changes are not seen by other transaction.

The locking service implemented by the transaction manager 101 may be referred to as deterministic parallel execution of transactions. For example, utilizing the locking service according to exemplary embodiments, deterministic parallel execution of transactions may be implemented in a manner that results in obtaining execution results that are the same as execution results performed using sequential execution following a specific order of input workloads. Once the locking service is utilized to acquire locks, the execution engine 102 may execute the transactions out of order, as described in further detail below. The execution engine 102 may be utilized to explore maximum levels of concurrency.

Lock acquiring performed by the locking service is performed sequentially (e.g., the transaction manager 101 acquires locks in a sequential manner). That is, lock acquiring is performed for each transaction received based on the original order of the received transactions. All locks are acquired for a transaction before execution of the transaction. For example, a first transaction $T_k$ is fetched from the execution queue. When a transaction $T_k$ is fetched from the execution queue, the transaction manager 101 first acquires locks for the read-write set of the transaction $T_k$. When all locks can be acquired for transaction $T_k$, the transaction manager 101 notifies the execution engine 102 to execute $T_k$. The execution engine 102, after finishing executing $T_k$, notifies the transaction manager 101 to release all locks of $T_k$. The execution engine 102 may execute multiple transactions at the same time. Although the transaction manager 101 acquires locks sequentially (e.g., one transaction after another according to the original order of transactions), locks may be released by the transaction manager 101 out of order.

Figure 2A:
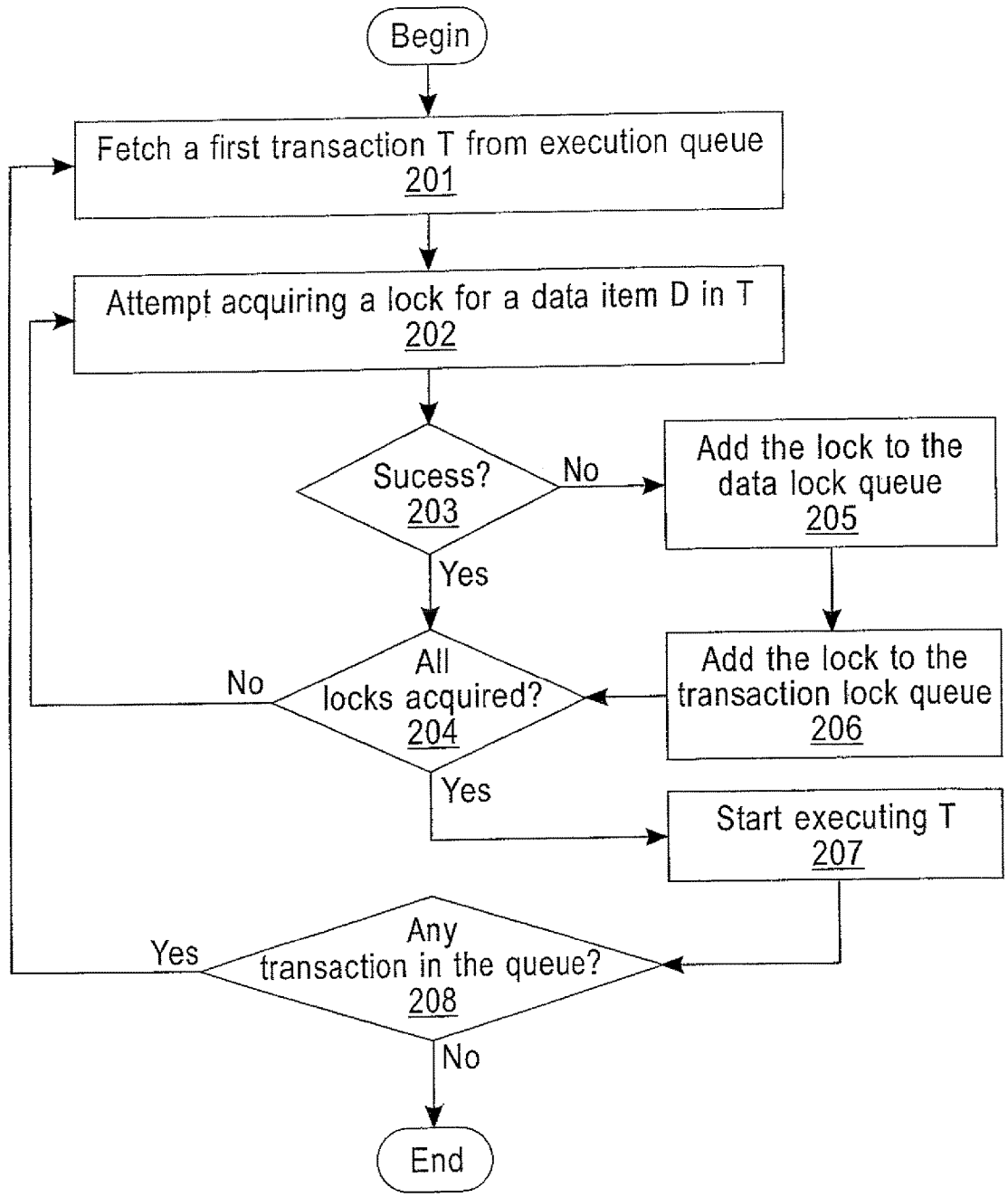
FIGS. 2A and 2B are flowcharts showing a locking process performed by a transaction processing system, according to an exemplary embodiment of the present invention.
Figure 2B:
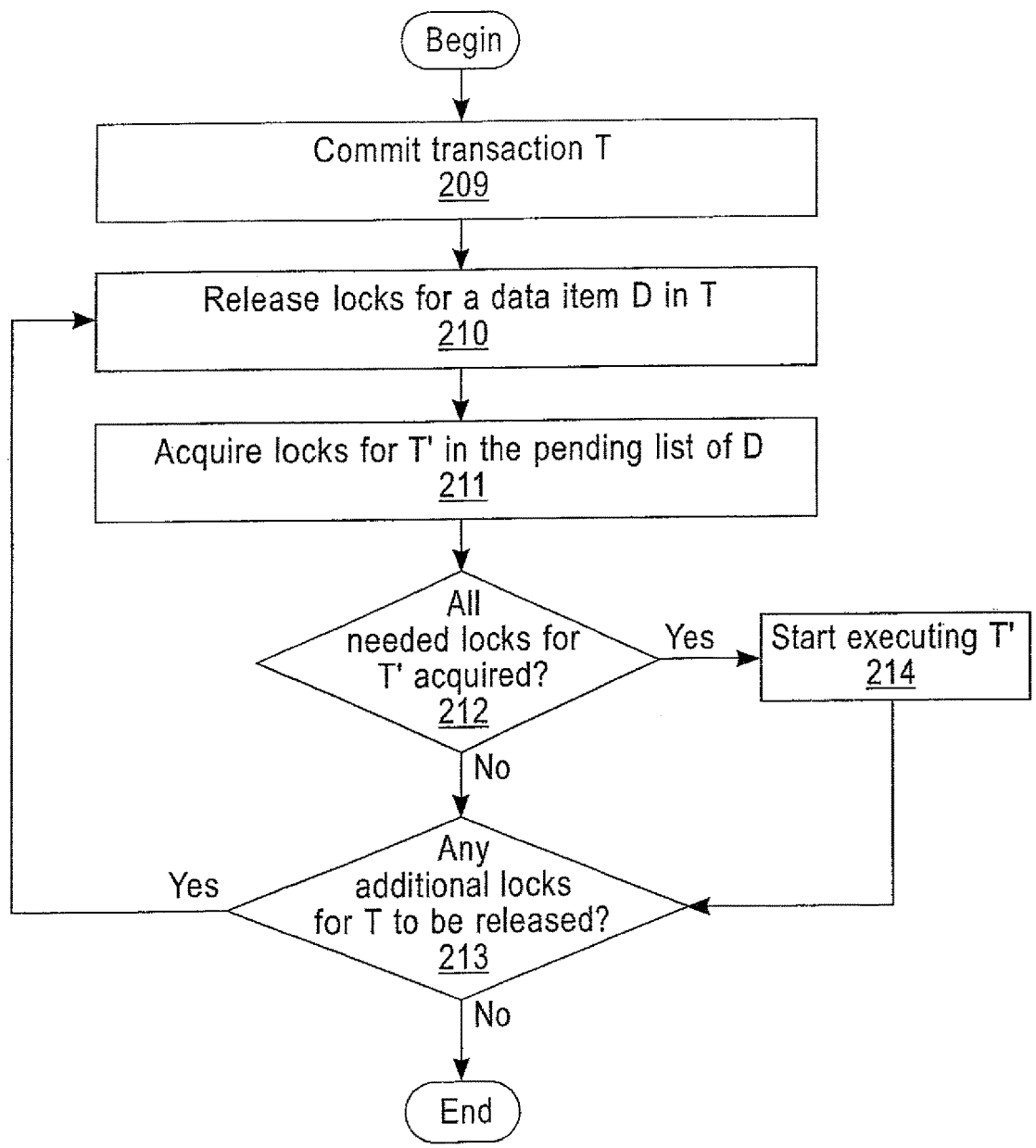

FIGS. 2A and 2B are flowcharts showing a locking process performed by the transaction manager 101, according to an exemplary embodiment of the present invention. FIG. 2A shows the lock acquiring portion of the locking process, and FIG. 2B shows the lock releasing portion of the locking process. The lock acquiring portion shown in FIG. 2A is performed sequentially (e.g., one transaction after another according to the original order of transactions), and the lock releasing portion shown in FIG. 2B may be performed in parallel (e.g., locks may be released out of order).

At block 201, a first transaction is fetched from the execution queue. At block 202, an attempt is made to acquire a lock for a data item needed by the first transaction. If the lock was successfully acquired at block 203, a determination is made as to whether all locks needed by the first transaction have been acquired at block 204. If the lock was not successfully acquired at block 203, the lock is added to a data lock queue at block 205, and is also added to a transaction lock queue at block 206. The data lock queue and the transaction lock queue are described in further detail below. Referring to block 204, once all locks needed by the first transaction have been acquired, the transaction may be executed at block 207. The acquisition of all needed locks includes the acquisition of all locks added to the data lock queue at block 205 and the transaction lock queue 206. This process repeats for all transactions in the execution queue at block 208.

Referring to the data lock queue and the transaction lock queue described above, the transaction manager 101 maintains a first-in, first-out (FIFO) data lock queue $Q_p$ of pending locks for locked data items d. The transaction manager 101 also maintains a transaction lock queue $L_p$ of pending locks for a running transaction. When a lock l' of transaction $T_k$ cannot be acquired for a data item d needed for execution of the transaction $T_k$ because of an existing lock l, the transaction manager 101 appends the new lock l' to the data lock queue $Q_p$ for data item d (e.g., $Q_p$ (d)). The transaction manager 101 also adds l' to the transaction lock queue $L_p$ for transaction $T_k$ (e.g., $L_p(T_k)$). When lock l is released, the transaction manager 101 acquires the first pending lock, l' in the data lock queue $Q_p$ (d), and removes l' from the data lock queue $Q_p$ (d) and the transaction lock queue $L_p(T_k)$. The transaction manager 101 then checks the transaction lock queue $L_p(T_k)$ to determine whether the transaction lock queue $L_p(T_k)$ is empty. If $L_p(T_k)$ is empty, the transaction manager 101 notifies the execution engine 102 to execute $T_k$, since all locks needed for the transaction $T_k$ have been acquired. Thus, the transaction manager 101 does not stop or delay processing when the transaction manager 101 fails to acquire a lock. Rather, the transaction manager 101 adds the lock that has not been acquired to the appropriate queue and continues to process the next lock. Since the transaction manager 101 acquires locks sequentially, the transaction manager 101 ensures that the results of the implemented out-of-order execution is the same as the results of sequential execution. Further, the sequential lock acquiring process may avoid deadlocks.

Referring to FIG. 2B, once transaction T has been successfully executed, the transaction T is committed at block 209, and locks acquired for the data items needed by the transaction T are released at block 210. Upon the release of these locks, locks corresponding to the data items needed by the next transaction T' may be acquired at block 211. At block 212, it is determined whether all locks needed by the next transaction T' have been acquired. If all locks have not been acquired, it is determined whether any additional locks are scheduled to be released by transaction T at block 213, and if additional locks are still to be released, the process repeats from block 210. If all locks needed by the next transaction T' have been acquired at block 212, the next transaction T' may begin execution at block 214.

Shared locks are certain locks used for reading data items, and exclusive locks are certain locks used for writing/updating data items. According to exemplary embodiments, the transaction manager 101 may acquire multiple simultaneous shared locks on the same data item, and can acquire one exclusive lock for any data item.

When the execution engine 102 successfully finishes execution of a transaction $T_k$, the execution engine 102 notifies the transaction manager 101 that the transaction $T_k$ is ready to be committed. The transaction manager 101 then adds $T_k$ along with all of its cached writes, which are discussed in further detail below, to an ordered committing queue where all transactions are ordered based on their original order. The transaction manager 101 then commits $T_k$ once all precedent transactions are committed. As a result, the underlying datastore 103 is maintained in a consistent state.

Once $T_k$ has been added to the committing queue, $T_k$ cannot be aborted. If the system crashes, the system can still recover by re-executing the same input workloads and getting the same results. As a result, the transaction manager 101 immediately releases the locks once $T_k$ is added to the committing queue. As a result, the transaction manager 101 may reduce the lock holding time (e.g., the lock footprint) by removing disk operations from the transaction critical execution path.

If the execution engine fails 102 to execute a transaction $T_k$, for example, due to logical errors, hardware failures, etc., the execution engine 102 notifies the transaction manager 101 that $T_k$ should be aborted. In this case, the transaction manager 101 immediately releases the locks of $T_k$ and processes the aborted transaction based on pre-defined policies (e.g., the transaction manager 101 may notify the client if $T_k$ is submitted by a local client, or the transaction manager 101 may reinsert $T_k$ into the execution queue for retrying).

A transaction may be categorized as a read-independent transaction or a read-dependent transaction. The locking service functions differently based on whether the transaction is a read-independent transaction or a read-dependent transaction. For example, referring to a read-independent transaction, the read-write set of the transaction is already known before execution. As a result, lock acquiring relating to read-independent transactions may start once a transaction is available. Referring to a read-dependent transaction, the read-write set of the transaction is not known before execution. As a result, lock acquiring relating to read-dependent transactions may not start until the read-write set is learned.

The description above with reference to FIGS. 2A and 2B relates to a read-independent transaction, in which the read-write set is known before execution of the transaction. An example of a read-independent transaction is a transaction that retrieves a stored value of an object.

An example of a read-dependent transaction is a transaction in which a set of customer records is updated only for customers in a certain geographical region. To perform the update, customer records meeting the criterion must first be identified.

To support read-dependent transactions, the transaction manager 101 performs an initial execution operation that identifies the read-write set before performing the actual execution operation described above with reference to FIGS. 2A and 2B. During the initial execution operation, the transaction manager 101 records the read-write set of the transaction and ignores all writes. The recorded read-write set is then used for acquiring locks. Once the locks are acquired, the execution engine 102 can perform the actual execution operation. Since it is possible for the read-write set to change after the initial execution operation (e.g., a new customer record may be inserted by a preceding transaction between the initial execution operation and the actual execution operation), the execution engine 102 performs an additional check just prior to, or during the actual execution operation, to determine whether the read-write set has changed. If any changes are detected by the additional check, the execution engine 102 notifies the transaction manager 101, and the transaction manager 101 aborts the transaction.

Depending on a user-specified policy, upon receiving the notification from the execution engine 102, the transaction manager 101 can abort the transaction and notify the user that the transaction has been aborted, allowing the user to submit the transaction at a later time, or the transaction manager 101 can re-execute the transaction by inserting it into the workload based on a pre-defined rule (e.g., a pre-defined rule may specify that aborted transactions are to be added to the end of the current workload list).

As described above, referring to read-dependent transactions, exemplary embodiments may utilize two rounds of execution. For example, an initial execution operation, in which all writes are ignored, may be executed, lock acquiring may be performed, and an actual execution operation may subsequently be performed. If a change in the read-write set is detected between the initial execution operation and the actual execution operation, the transaction may be aborted.

According to an exemplary embodiment, the execution engine 102 includes worker threads that execute transactions once all locks corresponding to the transactions have been acquired. For example, once a transaction $T_k$ has acquired all of its locks (e.g., all locks needed by the transaction $T_k$ in order for the transaction $T_k$ to execute), the execution engine 102 dispatches a worker thread to execute the transaction $T_k$. All write operations of a transaction may be kept in a temporary memory table in a local memory cache. When a transaction $T_k$ performs a read operation, the execution engine first checks the corresponding data items in the memory table to determine whether an in-memory new version exists in the local memory cache before checking the datastore 103. If a new version exists in the local memory, the in-memory version is utilized and no disk access is necessary, since the datastore 103 is not checked. When committing a transaction $T_k$ in the committing queue, the transaction manager 101 flushes the changes made in the temporary memory table to the underlying datastore 103. Since commit-related write operations are maintained in memory, releasing locks does not require immediate flushing of all committing-related write operations to disk. The execution engine 102 monitors the utilization of the underlying datastore 103. The execution engine 102 selects the earliest transaction in the committing queue to persist all write operations when disk activities are low. As a result, disk related latency on the execution critical path may be reduced. The execution engine 102 may also schedule persistence of cached write operations when the length of the committing queue exceeds a maximum length L, which may assist in avoiding to exhaust the memory. For example, the execution engine 102 persists cached write operations in strict order (e.g., the order of transactional workloads), and may schedule the persistence of cached write operations based on local datastore utilization. As used herein, the term persisting refers to applying the changes made by a transaction during execution to the underlying datastore 103. For example, as described above, changes made by a transaction during the execution stage are initially kept in a temporary memory region, which may be lost if a failure occurs (e.g., as the result of a crash, power failure, etc.) Persisting the changes to the datastore 103 refers to writing the changes to the datastore 103 (e.g., updating the data items in the datastore 103 to the latest versions).

As the execution engine 102 intensively leverages cache to remove disk operations from the critical path of sequential transaction execution, the lock footprint of each transaction is kept at a low level, which results in high throughput, even for workloads with high contention on a small set of hot data (e.g. data that is frequently accessed by a high number of transactions).

In an exemplary embodiment prefetching may be utilized by the transaction manager 101 to schedule the execution engine 102 to prefetch read results as soon as transactional workloads are available. For example, when a transaction is available to the transaction manager 101, the transaction manager 101 may immediately start to schedule worker threads in the execution engine 102, and read results may be prefetched into an in-memory table in the local memory cache to increase the speed of the execution of transactions. Prefetching may reduce the latency on the critical path of transaction execution. The transaction manager 101 may prioritize the prefetching of different transactions based on the read/write dependencies of the transactions. That is, the transaction manager 101 may schedule prefetching based on the lock dependencies between transactions. For example, since locking is decoupled from execution, the transaction manager 101 may prefetch transactions having the least pending locks.

When prefetching is utilized, since in-memory lock processing is faster than I/O bound data prefetching, the delay caused by I/O operations on the critical path may be reduced. Further, since read-dependent transactions utilize two rounds of execution, as described above, prefetching may particularly improve performance relating to read-dependent transactions. In an exemplary embodiment, the speed of the initial execution operation relating to a read-dependent transaction may be improved by the transaction manager 101 building indexes for frequently accessed/searched datasets (e.g., datasets having frequent read operations but few write operations). These indexes may be prefetched into the local memory and stored in the memory whenever possible. Further, the execution manager 102 may maintain updates on prefetched results when executing transactions to ensure the cached data is up-to-date.

The underlying datastore 103 can leverage data partitioning to distribute I/O workloads across multiple datastore nodes (e.g., each node may have a subset of the overall data). Herein, the terms datastore nodes, datastore partitions, nodes, and partitions may be used interchangeably. There are no restrictions on the manner in which data is to be partitioned across datastore nodes, as long as each datastore node can determine whether a given ID of a data item is contained in its local partition. According to an exemplary embodiment, the transaction manager 101 may be shared across all datastore nodes, and each datastore node may have its own execution engine 102. In an exemplary embodiment, the transaction manager 101 may be distributed across various datastore nodes.

Figure 3:
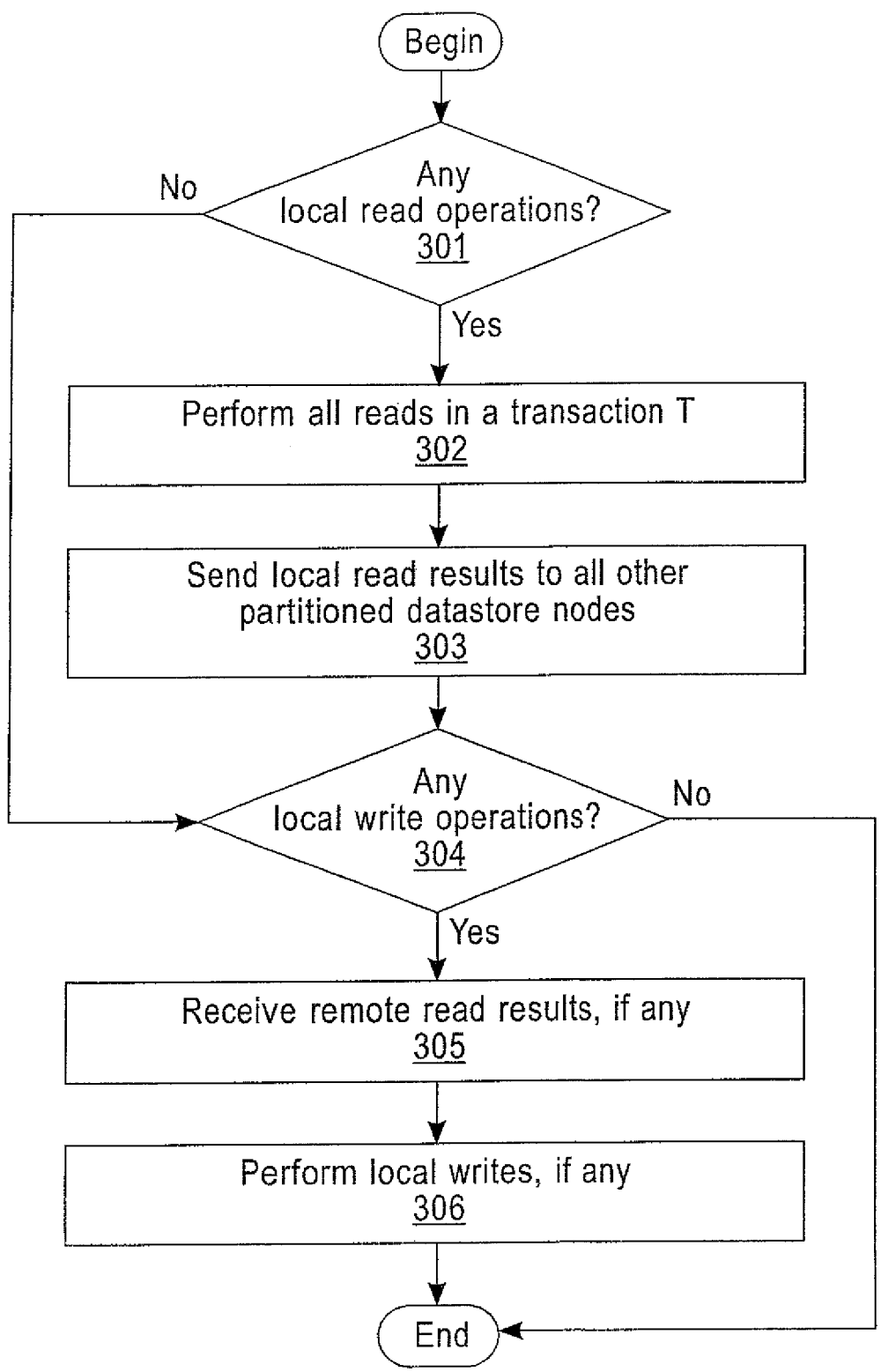
FIG. 3 is a flowchart showing a data partitioning process performed by a transaction processing system, according to an exemplary embodiment of the present invention.

FIG. 3 is a flowchart showing a data partitioning process performed by a transaction processing system, according to an exemplary embodiment of the present invention.

According to an exemplary embodiment, a data partitioning process first determines whether there are any local read operations at block 301. If there are no local read operations, it is determined whether there are any local write operations at block 304. When the execution engine 101 on a datastore node executes a transaction, it first performs all read operations at block 302. For local data items, each datastore node reads local results and sends the results to all other datastore nodes at block 303. For remote data items, each datastore node waits for other datastore nodes to send corresponding read results at block 305. Once all read results have been collected, the datastore node starts to perform all write operations at block 306. Regarding write operations, each datastore node processes write operations only for local data items, and ignores all remote data items. Unnecessary workloads may be avoided by a datastore node by ignoring a transaction if the datastore node determines that the read-write set of the transaction contains no local items (e.g., no local read operations and no local write operations). The number of ignored transactions may increase as the number of partitioned datastore nodes in a datastore 103 increases.

In an exemplary embodiment, each data partition may be replicated over multiple datastore nodes to ensure the availability of the system. In this embodiment, the execution engine 102 on each datastore node of the same data partition can execute transactions independently, since the implemented deterministic parallel execution results in the sequential consistency of the results. Since multiple datastore nodes may send out read results, a datastore node may only accept the first received result and may ignore all other results. As a result, read latency may be improved as the fastest datastore node determines the read latency.

According to exemplary embodiments, backup and recovery may be implemented by the transaction processing system. For example, a snapshot state of the datastore 103 may be saved during a backup/checkpointing procedure. The saved snapshot may be used to reduce the time needed for recovery during a recovery process, since the recovery process may commence by loading the most recent saved snapshot, and replaying all previous workloads up to the point where a failure or crash occurred.

Since the transaction system 100 according to exemplary embodiments reaches a sequential consistent point after committing each transaction, checkpointing can be performed after the commit of any transaction. Since the system 100 caches writes associated with a commit, the commit of a transaction may be used to refer to the process during which the transaction manager 101 flushes the cached writes of a transaction to the datastore 103.

According to an exemplary embodiment, for recovery purposes, all incoming transactional workloads may be recorded, including the order of transactions.

According to an exemplary embodiment, the transaction system 100 may be independent of the underlying checkpointing technique, as long as the checkpointing process returns a complete snapshot for the data on the datastore 103. For example, all data in the datastore 103 may be copied to a different location at the file system level. However, since the checkpointing process is utilized with consistent data, transaction execution involving data updates in the datastore 103 may not be permitted during checkpointing. As a result, the transaction manager 101 may temporarily suspend all writes to the datastore 103 by caching all commit related writes until the checkpointing process finishes. Further, efficient disk-based checkpointing techniques such as, for example, Zig-Zag checkpointing, may be utilized with exemplary embodiments of the present invention.

To perform a recovery, the system 100 first loads the most recent snapshot produced by the checkpointing process, and then replays all transactional workloads that are not committed at the point of the snapshot until the point of the failure or crash is reached. If the underlying datastore 103 supports multi-versioning, the underlying datastore 103 may revert to a previous consistent version of data and then replay transactions.

Figure 4:
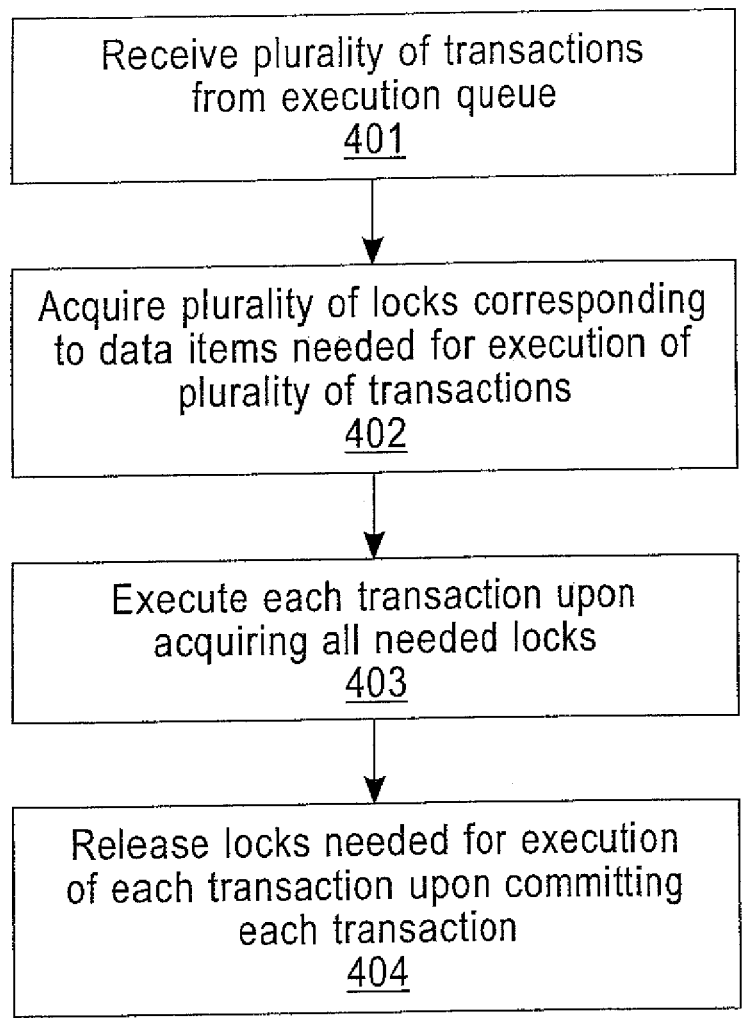
FIG. 4 is a flowchart showing a transaction processing method, according to an exemplary embodiment of the present invention.

FIG. 4 is a flowchart showing a transaction processing method, according to an exemplary embodiment of the present invention. At block 401, a plurality of transactions are received from an execution queue. The plurality of transactions have a specified order within the execution queue. At block 402, a plurality of locks corresponding to data items needed for execution of the plurality of transactions are acquired. The plurality of locks are sequentially acquired based on the specified order of the plurality of transactions within the execution queue. At block 403, each transaction of the plurality of transactions is executed upon acquiring all locks needed for execution of each transaction. As described above, an order of execution of the plurality of transactions is different from the specified order of the plurality of transactions within the execution queue. At block 404, the locks needed for execution of each transaction of the plurality of transactions are released upon committing each transaction.

Exemplary embodiments of the present invention provide an out-of-order execution framework that utilizes a locking mechanism with a locking method to ensure the sequential property of execution. For example, since exemplary embodiments of the out-of-order execution framework may be utilized in an environment having a strict sequential operation requirement, the read-write set should be known to the locking method prior to the execution of a given workload. Exemplary embodiments of the present invention are capable of providing the read-write set to the locking method prior to execution.

Exemplary embodiments further provide techniques that leverage cache in a system to reduce a lock footprint of workloads and execution time, thereby improving execution efficiency in disk-based systems. Exemplary embodiments further provide techniques that enable scaling out the execution system via data partitioning, and techniques for backup and recovery of the system.

Exemplary embodiments of the present invention may be utilized with single transactional put/get operations, and transactions containing multiple operations. Further, exemplary embodiments support full-featured ACID (Atomicity, Consistency, Isolation, Durability) transactions including a high level of consistency.

Exemplary embodiments of the present invention provide a high level of sequential consistency, which results in execution results being the same as the results of strict sequential execution of incoming transactions according to the arrival order of transactions. Further, exemplary embodiments may provide a deadlock free implementation.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various exemplary embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
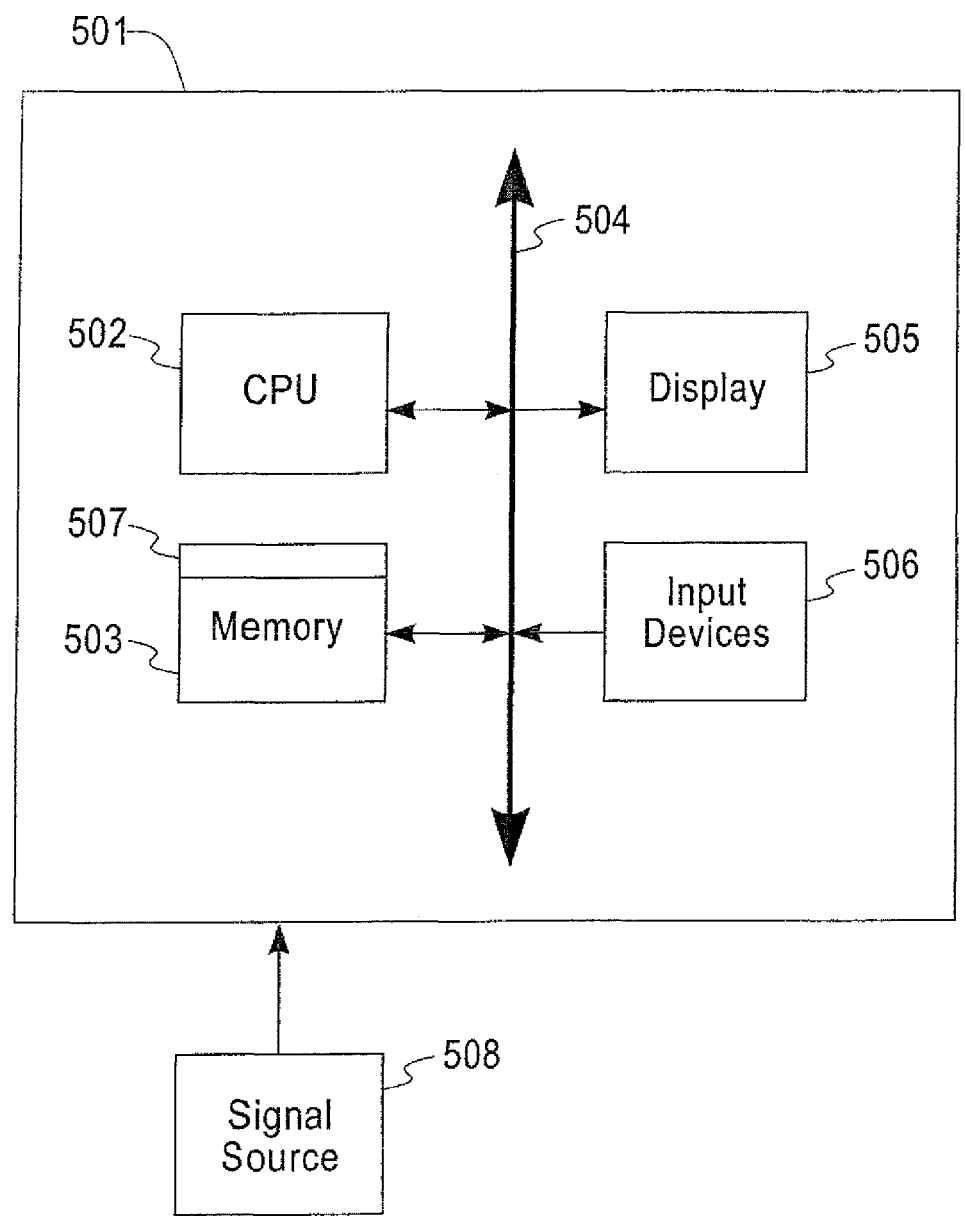
FIG. 5 illustrates a computer system for implementing aspects of exemplary embodiments of the present invention.

Referring to FIG. 5, according to an exemplary embodiment of the present invention, a computer system 501 for implementing aspects of the present invention can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general-purpose computer system that becomes a specific purpose computer system when executing the routine 507 of the present invention.

The computer platform 501 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described exemplary embodiments for a system and method for out-of-order execution of strictly-ordered transactional workloads, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable storage medium embodying instructions executed by a processor to perform a method of transaction processing, comprising:
receiving a plurality of transactions from an execution queue, wherein the plurality of transactions have a specified order within the execution queue;
acquiring a plurality of locks corresponding to data items needed for execution of the plurality of transactions, wherein the plurality of locks are sequentially acquired based on the specified order of the plurality of transactions within the execution queue;
executing each transaction of the plurality of transactions upon acquiring all locks needed for execution of each transaction, wherein an order of execution of the plurality of transactions is different from the specified order of the plurality of transactions within the execution queue;
releasing the locks needed for execution of each transaction of the plurality of transactions upon committing each transaction;
maintaining a single first-in, first-out (FIFO) data lock queue containing a first plurality of pending locks that has not yet been acquired, wherein each pending lock in the data lock queue corresponds to one of the data items that is currently locked by a first one of the plurality of transactions and that is needed for execution of a second one the plurality of transactions, and wherein the first plurality of pending locks comprises pending locks for all locked data items needed for execution of all of the plurality of transactions; and
maintaining a transaction lock queue comprising a second plurality of pending locks that has not yet been acquired, wherein each pending lock in the transaction lock queue corresponds to one of the data items that is needed for execution of one of the plurality of transactions and includes a reference to the corresponding one of the plurality of transactions.

2. The non-transitory computer readable storage medium of claim 1, wherein the data items are located in a datastore.

3. The non-transitory computer readable storage medium of claim 2, wherein the datastore comprises one of a NoSQL database or a relational database.

4. The non-transitory computer readable storage medium of claim 2, wherein executing each transaction comprises reading first data and writing second data.

5. The non-transitory computer readable storage medium of claim 4, Wherein the method of transaction processing further comprises:
reading the first data from a local memory cache corresponding to the datastore; and
writing the second data to the local memory cache.

6. The non-transitory computer readable storage medium of claim 4, wherein the method of transaction processing further comprises:
attempting to read the first data from a local memory cache corresponding to the datastore prior to reading the first data from the datastore; and
only writing the second data to the local memory cache.

7. The non-transitory computer readable storage medium of claim 2, wherein the method of transaction processing further comprises:
generating a snapshot of all data stored on the datastore upon committing each transaction; and
loading a most recent snapshot upon a system failure.

8. The non-transitory computer readable storage medium of claim 1, wherein an order in which the plurality of locks are acquired is different from an order in which the plurality of locks are released.

9. The non-transitory computer readable storage medium of claim 1 further comprising:
adding a new pending lock to the data lock queue and the transaction lock queue when the new lock is unable to be acquired for a target data item; and
removing the new pending lock from the data lock queue and the transaction lock queue upon acquiring the new lock.

10. The non-transitory computer readable storage medium of claim 1, wherein executing each transaction comprises an initial execution operation that identifies a read-write set of the transaction and ignores all write operations corresponding to the transaction, and an actual execution operation, wherein the initial execution operation is performed prior to acquiring the plurality of locks and the read-write set is used to acquire the plurality of locks, and the actual execution operation is performed subsequent to acquiring the plurality of locks.

11. The non-transitory computer readable storage medium of claim 1, wherein each transaction of the plurality of transactions is executed upon determining that the transaction to be executed is not referenced in the transaction lock queue.

12. A non-transitory computer readable storage medium embodying instructions executed by a processor to perform a method of transaction processing, comprising:
- receiving a plurality of transactions from an execution queue, wherein the plurality of transactions have a specified order within the execution queue;
- acquiring a plurality of locks corresponding to data items needed for execution of the plurality of transactions, wherein the plurality of locks are sequentially acquired based on the specified order of the plurality of transactions within the execution queue;
- maintaining a first-in, first-out (FIFO) data lock queue containing a first plurality of pending locks that has not yet been acquired, wherein each pending lock in the data lock queue corresponds to one of the data items that is currently locked by a first one of the plurality of transactions and that is needed for execution of a second one the plurality of transactions, and wherein the first plurality of pending locks comprises pending locks for all locked data items needed for execution of all of the plurality of transactions;
- maintaining a transaction lock queue comprising a second plurality of pending locks that has not yet been acquired, wherein each pending lock in the transaction lock queue corresponds to one of the data items that is needed for execution of one of the plurality of transactions and includes a reference to the corresponding one of the plurality of transactions;
- upon determining that a transaction to be executed is not referenced in the transaction lock queue, executing each transaction of the plurality of transactions upon acquiring all locks needed for execution of each transaction, wherein an order of execution of the plurality of transactions is different from the specified order of the plurality of transactions within the execution queue; and
- releasing the locks needed for execution of each transaction of the plurality of transactions upon committing each transaction.

13. The non-transitory computer readable storage medium of claim 12, wherein the data items are located in a datastore.

14. The non-transitory computer readable storage medium of claim 13, wherein the datastore comprises one of a NoSQL database or a relational database.

15. The non-transitory computer readable storage medium of claim 13, wherein executing each transaction comprises reading first data and writing second data.

16. The non-transitory computer readable storage medium of claim 15, wherein the method of transaction processing further comprises:
- reading the first data from a local memory cache corresponding to the datastore; and
- writing the second data to the local memory cache.

17. The non-transitory computer readable storage medium of claim 15, wherein the method of transaction processing further comprises:
- attempting to read the first data from a local memory cache corresponding to the datastore prior to reading the first data from the datastore; and
- only writing the second data to the local memory cache.

18. The non-transitory computer readable storage medium of claim 12, wherein an order in which the plurality of locks are acquired is different from an order in which the plurality of locks are released.

19. The non-transitory computer readable storage medium of claim 12, further comprising:
- adding a new pending lock to the data lock queue and the transaction lock queue when the new lock is unable to be acquired for a target data item; and
- removing the new pending lock from the data lock queue and the transaction lock queue upon acquiring the new lock.

20. The non-transitory computer readable storage medium of claim 12, wherein the FIFO data lock queue is a single queue, and the first plurality of pending locks comprises pending locks for all locked data items.

* * * * *